United States Patent Office 3,436,918
Patented Apr. 8, 1969

3,436,918
MAGNETOHYDRODYNAMIC MOTOR-GENERATOR
Thomas R. Brogan, Malden, and William E. Powers, Jr., Acton, Mass., assignors to the United States of America as represented by the Secretary of the Air Force
Filed Nov. 8, 1966, Ser. No. 593,248
Int. Cl. F03h 1/00; H05h 1/02; G21d 7/02
U.S. Cl. 60—202
2 Claims

ABSTRACT OF THE DISCLOSURE

A magnetohydrodynamic motor-generator including an MHD generator having a nuclear heat source or rocket engine burner and an MHD motor using a nuclear heat source or electric arc connected directly to the generator.

---

This invention relates generally to a motor-generator and more specifically to a device which utilizes an MHD accelerator or compressor in combination with and powered by an MHD generator to achieve a high energy or high density gas effluent condition.

In this invention a gas is heated to a high degree by means of a nuclear heat source, a high power electric arc plasma generator or alternatively a shock wave. After raising the temperature, the gas is seeded to raise its conductivity. Magnetohydrodynamic forces are then employed to do work on the highly conductive gas to raise the energy level or density, using powered electrodes in an applied magnetic field. The MHD generator output is used to supply power directly to drive the motor.

This device may be utilized as a simulator to match the conditions of hypersonic flight through, or reentry into, planetary atmospheres; as a space propulsion thrustor; or as a thrust augmentor for rocket type propulsion schemes in the earth's atmosphere by employing air as the working fluid for the accelerator.

It is therefore a broad object of this invention to provide a new and improved MHD motor-MHD generator combination.

It is a further object of this invention to provide a device which will match the conditions of reentry into planetary atmospheres.

It is another object of this invention to provide a space propulsion thrustor utilizing magnetohydrodynamic principles.

It is still a further object of this invention to provide MHD motor-generator combination which utilizes nuclear energy.

These and other advantages, features and objects of the invention will become more apparent from the following description taken in connection with the illustrative embodiments in the accompanying drawings, wherein.

Figure 1:
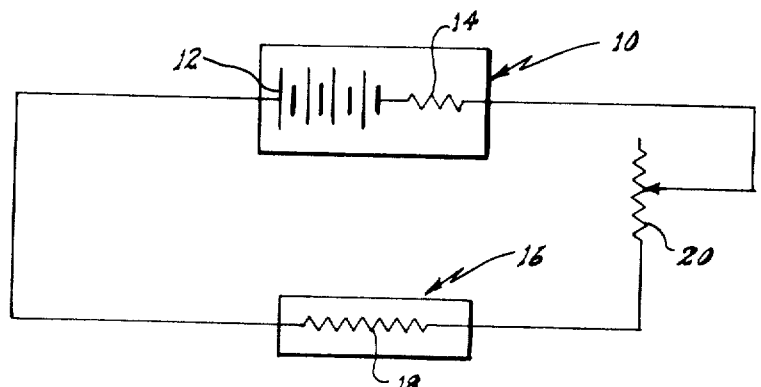
FIGURE 1 is a simplified schematic representation illustrating the relationship of the components of this invention.
Figure 4:
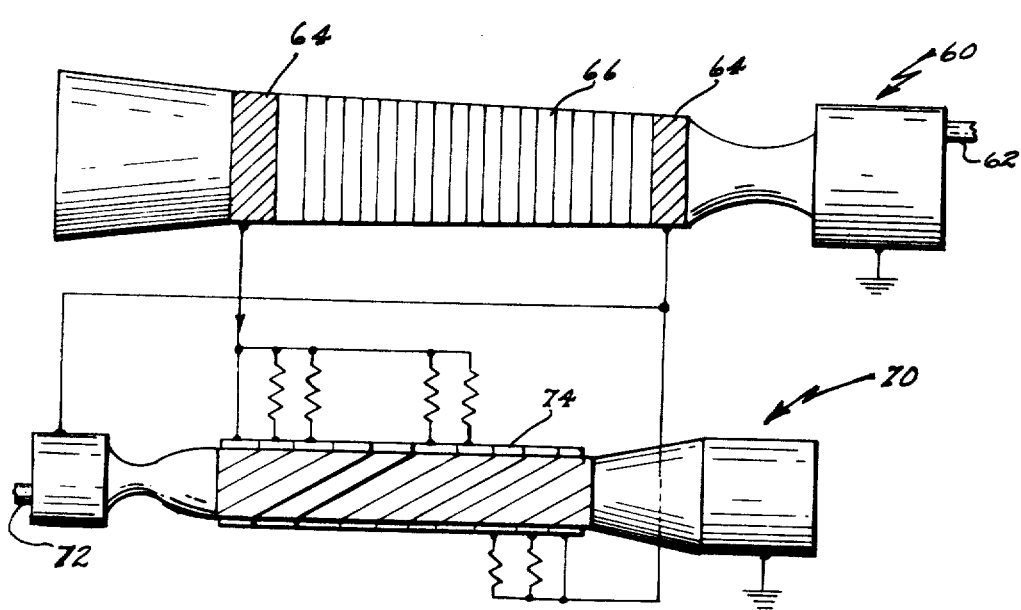
FIGURE 4 is a representation of a motor-generator generally similar to that of FIGURE 3 utilizing a circular ring generator and an accelerator with diagonal construction.

Referring now to FIGURE 1 an MHD generator is represented by the block 10. Ordinarily within the generator there are a plurality of electrodes, however, for this particular description only one pair of electrodes will be considered for the generator and accelerator. The generator electrodes have a source of electrical potential 12 as well as an internal resistance 14. The MHD accelerator 16 has an electrode pair 18 directly connected in series with the generator electrode pair. A variable ballast 20 is provided to match the impedance between the pairs of electrodes. Where the electrodes are connected in this manner, called the linear or Faraday mode, the operating current for the generator and accelerator electrodes will match. However, where a diagonal construction arrangement is utilized for the accelerator such as is shown in FIGURE 4, there is a more or less constant current distribution across the electrodes except when supplemented by an auxiliary circuit connection as shown in FIGURE 2.

Following the operational considerations in a system such as this, the economic point of view on the choice and design of the power supply becomes of critical importance. When the time element of operation, either short term or long duration, is taken into consideration the economic factor is particularly critical. Similarly the power level of operation is also an important factor, e.g., to match the scale requirement and kinetic enthalpy appropriate to the escape velocity from the atmosphere (26 mega-joules/lb.) extremely large power levels evolve in a useful wind tunnel employing an MHD accelerator. The cost of conventional power conversion equipment and circuitry can become extreme. With an MHD generator power supply, relatively simple equipment is involved and the MHD processes become more efficient at higher power levels, leading to distinct advantages when used in conjunction with an MHD motor or MHD generator.

A distinct advantage of the MHD motor-generator combination is that generally no switch gear is required between the motor or generator. Likewise the required ballast resistance, shown in FIGURE 1 could be provided internally in the MHD generator. A further advantage of this combination is the fast rise time. The MHD generator can be at full power in a matter of seconds, eliminating the need for separate load buildup circuitry and resistors which might be required with more conventional power sources.

Figure 2:
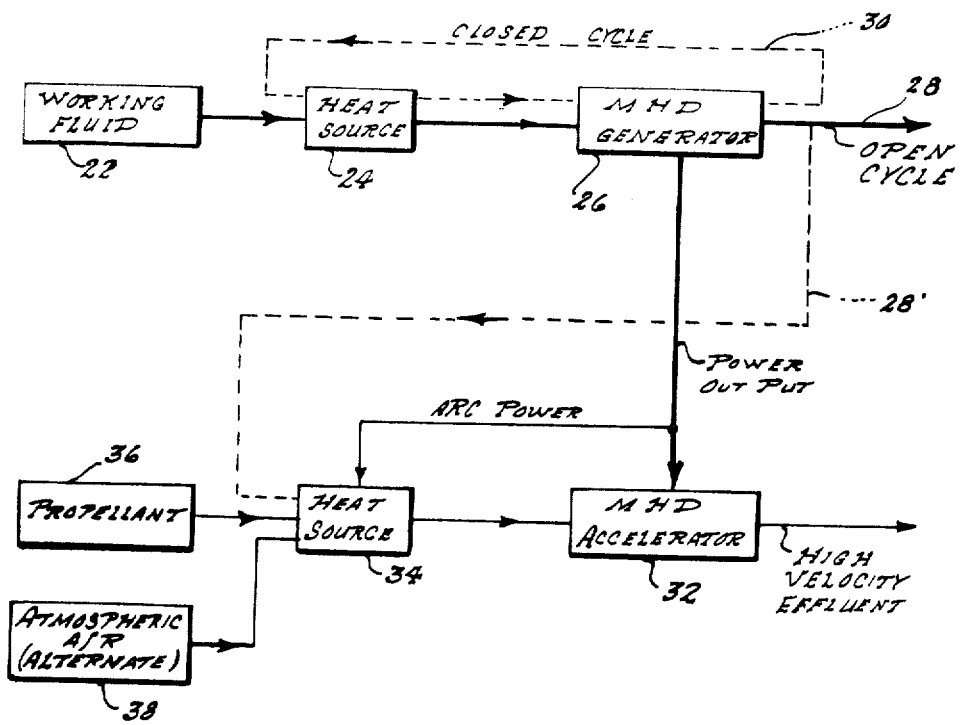
FIGURE 2 is a block diagram illustrating the use of this invention with a nuclear heat source in a space propulsion role.

FIGURE 2 illustrates a method of utilizing this invention to provide a space propulsion capability. A working fluid enters the heat source 24 to provide a working plasma for the generator 26 either as an open cycle system (28) or as a closed cycle loop 30. The heat source 24 may be a nuclear reactor or rocket engine for space applications. Similarly the heat source 34 may be an electric arc or nuclear reactor. In the open cycle case the working fluid could conceivably be common to both the generator 26 and the accelerator 32 as the propellant. In addition the generator might be utilized to supply auxiliary power to a preheater electric arc 34 for the accelerator. The accelerator 32 is open cycle of necessity and might use the generator working fluid or alternatively a separate source 36 for the propellant may be provided. The output of the accelerator is a high velocity affluent gas. By using nuclear reactors as the heat source a higher specific impulse and higher propulsion efficiency can be achieved than with pure rocket systems in the space environment. In the space application the MHD generators can operate at higher temperatures than conventional systems which is more readily compatible with cycle heat rejection by radiation. The working fluid can also be utilized as a heat sink through recycling processes. If this system were to be utilized as a thrust augmentor the MHD generator output is used to power an MHD accelerator operating an atmospheric air intake shown at 38 in FIGURE 2. The purpose of this is to provide a booster capability to augment the thrust derived from a nuclear or chemical rocket engine propulsion system.

Figure 3:
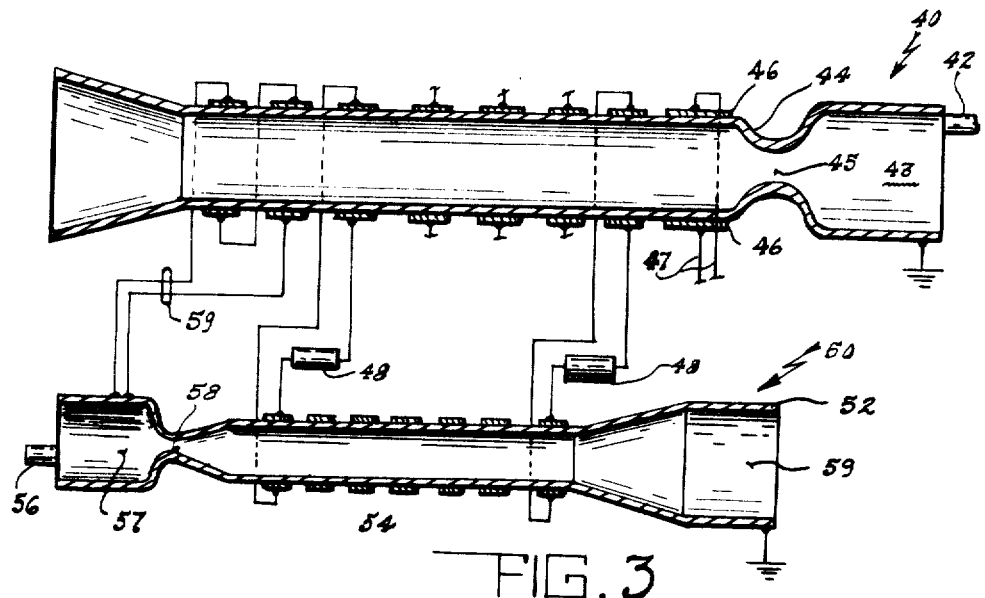
FIGURE 3 shows a motor-generator device utilizing individually connected electrode pairs.

Concerning FIGURE 3, an MHD generator is shown generally at 40. Gas or fuel plus seed enters the generator at 42, and passes to a nuclear reactor or rocket engine 43, where it is heated and expanded through the nozzle 45. Electrically insulated side walls 44 and are used as the generator operates in a magnetic field which is normal to the gas flow. If a rocket engine were utilized the generator would be of the open cycle style while a nuclear reactor would warrant closed cycle operation. The MHD generator can be self-excited, i.e., supply power for its own magnetic field, and can also be used to provide auxiliary electric power for operation of an arc plasma generator preceding the accelerator. Power for the excitation of the field coils would enter through leads 47 regardless of whether the generator is self-excited or uses an outside source of power. The accelerator, generally shown at 50, consists of a multiple electrode channel 52 with electrically insulated side walls 52 and electrodes 54 which are connected in pairs through the ballast 48 to the electrodes of the generator. The accelerator operates in a magnetic field which may be considered as directed into the paper. The gas and seed for the accelerator enter through 56 and are heated by an electric arc or nuclear heat source 57. Power is supplied through leads 59 from the generator. The heat source supplies the highly conductive plasma to the accelerator. The plasma from the heater is expanded through a nozzle 58 and enters the accelerator channel at a supersonic velocity. Acceleration would occur through the crossed field interaction of the current flow between electrodes and the magnetic field normal to this. Expansion of the gas to even higher velocities would be possible by utilizing a vacuum pumping system at the channel exit 59.

FIGURE 4 discloses essentially the same combination as FIGURE 3, however, in FIGURE 4 there is shown a Hall generator using circular ring construction and a Faraday type accelerator with diagonal construction. The seeded gas enters the generator 60 at 62 where it is heated and expanded in the same manner described in FIGURE 3. The electrodes 64 are separated by a plurality of circular rings 66. Power is tapped from these end electrodes and sent to the diagonal electrode arrangement 74 on the accelerator 70. By using an electrical diagonal hookup the Hall voltage effect in the two machines is compensated for so that the generator inlet and accelerator outlet and vice versa which have the same electrical potential can be directly connected. The seeded gas enters the heat source at 72 and is expanded through a nozzle and raised to a supersonic velocity in exactly the same manner as described in FIGURE 3.

We claim:
1. An apparatus for producing a high energy, high density gas effluent condition comprising: a Hall-effect magnetohydrodynamic generator including a first nuclear heat source, an ionizable fluid, a duct for directing the fluid after heating by said source, and electrodes located near the ends of said duct whereby electrical power generated by the flow of hot fluid through the generator is removed; and a magnetohydrodynamic accelerator including a second nuclear heat source, an ionizable fluid, a duct for directing the fluid after heating by said second source, and a plurality of electrodes arranged along the longitudinal axis of the accelerator and having their longitudinal axis diagonal to said longitudinal axis of said accelerator and connected directly to the generator whereby the inlet of the generator and the outlet of the accelerator have the same electrical potential.

2. An apparatus for producing a high energy, high density gas effluent condition comprising: a Hall-effect magnetohydrodynamic generator including a rocket engine burner, an ionizable fluid, a duct for directing the fluid after heating by said burner, and electrodes located near the ends of said duct whereby electrical power generated by the flow of hot fluid through the generator is removed; and a magnetohydrodynamic accelerator including an electric arc, an ionizable fluid, a duct for directing the fluid after heating by said electric arc, and a plurality of electrodes arranged along the longitudinal axis of the accelerator and having their longitudinal axis diagonal to said longitudinal axis of said accelerator and connected directly to the generator whereby the inlet of the generator and the outlet of the accelerator have the same electric potential.

References Cited

UNITED STATES PATENTS

| 2,643,349 | 6/1953 | Smith | 60—202 |
|---|---|---|---|
| 3,099,131 | 7/1963 | Rosa | 60—202 |
| 3,102,852 | 9/1963 | Schenck | 60—224 |
| 3,201,622 | 8/1965 | Thring | 310—11 |
| 3,229,156 | 1/1966 | Reid | 315—111 |
| 3,360,666 | 12/1967 | Klein | 310—11 |

FOREIGN PATENTS 738,511   2/1953   Great Britain.

CARLTON R. CROYLE, *Primary Examiner.*

U.S. Cl. X.R.

60—203, 224, 257; 219—121; 310—11; 313—63; 315—111